3,462,505
PROCESS FOR CATALYTICALLY DEHYDROCY-
CLIZING ALIPHATIC HYDROCARBONS
John Mooi, Homewood, and Glenn O. Michaels, South
Holland, Ill., assignors to Sinclair Research, Inc., New
York, N.Y., a corporation of Delaware
No Drawing. Continuation-in-part of application Ser. No.
608,221, Jan. 9, 1967. This application May 8, 1967,
Ser. No. 636,682
Int. Cl. C07c 5/18, 15/08
U.S. Cl. 260—673.5          13 Claims

ABSTRACT OF THE DISCLOSURE

A process for the dehydrocyclization of an aliphatic hydrocarbon of 6 to 20 carbon atoms which comprises contacting the hydrocarbon under vapor phase dehydrocyclization conditions including a temperature of about 900 to 1250° F. with a catalyst consisting essentially of about 1 to 40 percent by weight $Cr_2O_3$, about 1 to 40 percent by weight MgO, about 0.1 to 4 percent by weight alkali metal present as the alkali metal oxide, and activated alumina.

---

This application is a continuation-in-part of S.N. 608,221, filed Jan. 9, 1967, now U.S. Patent No. 3,363,023, which latter application is a continuation of S.N. 376,252, filed June 18, 1964 now abandoned. This invention relates to the dehydrocyclization of hydrocarbons.

The introduction of catalytic reforming has created interest in the production of specific aromatic compounds by the dehydrocyclization of appropriate aliphatic paraffins or olefins. Chromia-alumina type catalysts have been most commonly used for this reaction although other types of catalysts have been used occasionally. Two major disadvantages of this approach to the preparation of aromatics are first, selectivity to aromatization for most catalysts is poor; and second, the selectivity to the specific desired product is often so low that elaborate separation procedures are required.

It has now been discovered that such dehydrocyclization of hydrocarbons in the presence of the catalyst used in this invention considerably minimizes isomerization of all types, i.e., skeletal isomerization and double bond migration, so that high yields and selectivities of the desired product are obtained. The catalyst used in the present invention contains $Cr_2O_3$, MgO, alkali metal oxide and alumina. The amount of $Cr_2O_3$ in the catalyst will usually fall in the range of at least about 1 or 5 up to about 40 percent by weight, preferably about 10 to 20 percent by weight. The amount of MgO forming part of the catalyst can also vary widely, say from about 1 to 40 percent, preferably about 1 to 20 percent by weight. The amount of alkali metal oxide in the catalyst is very important as too little alkali metal oxide does not prevent isomerization and too much alkali metal oxide causes increased coke yields and lower activity. Acceptable results are usually obtainable when about 0.1 to 4 percent by weight, preferably 0.1 to 2 percent by weight, alkali metal (in the form of alkali metal oxide), is present. It should be appreciated, however, that the most advantageous level of alkali metal oxide may vary from catalyst to catalyst and for best results can be determined in every specific case. For example, when a magnesium aluminate spinel is employed, advantageous results can be obtained with about 0.4 to 0.6 percent by weight alkali metal, whereas when the MgO is provided by impregnation of an essentially alumina support usually about 0.8 to 2 percent by weight alkali metal gives best results. The preferred alkali metal oxide is sodium oxide, although other alkali metal oxides, i.e., the oxides of potassium, cesium and rubidium can also be used. The essential balance of the catalyst is activated alumina, including the mixed oxide or magnesium aluminate spinel forms.

In accordance with the process of the present invention, the hydrocarbon to be dehydrocyclized is contacted under dehydrocyclization conditions with the dehydrocyclization catalyst. The dehydrocyclization process is conducted in the vapor phase under an elevated temperature, for instance, about 900 to 1250° F., preferably about 1000 to 1150° F. The hydrocarbon pressure in the reaction zone is often up to about 2 atmospheres or somewhat more. Generally, increased selectivities are obtained at hydrocarbon pressures below atmospheric, say down to about 0.05 atmosphere or below with a hydrocarbon pressure of about 0.1 to 0.5 atmosphere being preferred for economic reasons. If desired, an inert diluent or vacuum can be employed to reduce the hydrocarbon partial pressure in the reactor. Various essentially inert gaseous diluents can be employed but it is preferred to use nitrogen, hydrogen or methane. The inert gas, when used, is usually present in an amount of about 0.5 to 50 moles, preferably about 5 to 25 moles, per mole of hydrocarbon feed. The contact time or weight hourly space velocity (WHSV), can vary depending on the temperature and pressure employed but will generally range from about 0.1 to 5, preferably about 0.25 to 1.0 WHSV.

The alumina component which constitutes the essential balance of the catalyst composition is considered to be the catalyst base, and preferably is the major component. Activated or gamma-family aluminas can be employed such as those derived by calcination of amorphous hydrous alumina, alumina monohydrate, alumina trihydrate or their mixtures. Advantageously the alumina precursor may be a mixture predominating in, for instance, about 65 to 95 percent by weight, in one or more of the alumina trihydrates: bayerite, nordstrandite or gibbsite, and about 5 to 35 percent by weight alumina monohydrate (boehmite), amorphous alumina or their mixtures. Catalyst base precursors of this type are disclosed in U.S. Patents Nos. 2,838,444 and 2,838,445. The alumina base may also contain small amounts of other solid oxides.

The MgO component of the catalyst can be provided through a MgO-containing alumina base as, for example, the magnesium aluminate spinel prepared by known methods. A preferred method of obtaining a suitable magnesium aluminate spinel is described in U.S. Patent No. 2,992,191 to Henry Erickson. In this method the support is formed by reacting in an aqueous medium a soluble magnesium inorganic salt and a soluble aluminum salt in which the aluminum is present in the anion. Suitable salts are exemplified by the water-soluble strongly acidic magnesium salts such as the chloride, nitrate or sulfate and the water-soluble alkali metal aluminates. The magnesium and aluminate salts are dissolved in an aqueous medium, and a spinel precursor is precipitated through neutralization of the aluminate by the acidic magnesium salt. Excesses of acid salt or aluminate are preferably not employed, thus avoiding the precipitation of excess alumina or magnesia. The dried spinel precursor is not a magnesium spinel but rather is probably a mixture such as gibbsite and brucite. Calcination of the precursor at suitable calcining temperatures ranging, for instance, from about 800 to 1300° F. or more, converts at least a substantial portion of the precursor to a crystalline spinel. Spinels containing the equivalent of about 1 to 40 percent by weight of MgO, preferably about 1 to 20 percent, with the essential balance being $Al_2O_3$ may be used as supports for the preparation of the catalyst of the invention.

Impregnation of the alumina base with the catalytically active metal components can be by known methods. For instance, the base can be mixed with an aqueous solution of a water-soluble salt of the catalytically active components of the invention to absorb all or part of the solution in the support which is then dried and calcined, for instance, at the temperatures noted above. Alternatively, the active components can be precipitated on the support through neutralization of a slurry of the support and water-soluble compounds of the catalytically active metals and then drying and calcining. Calcining activates the catalyst and, if not already present as the oxides of chromium, alkali metal and magnesium, converts the catalytically active metal components to their oxide form. The impregnation with the catalytically active components can be done separately or simultaneously.

If desired, the alumina base can be ground before the addition of the catalytic metals and the resulting material formed, if desired, into larger particles, impregnated and dried before effecting the calcination which gives the final catalyst. Alternatively, the base particles can be directly impregnated, dried and calcined; or, directly impregnated, ground and formed into shaped particles by tabletting or extrusion and then recalcined. It is preferred to calcine the alumina or MgO-containing alumina prior to addition of the catalytically active components. After the catalytically active components are added to the base, the resulting catalyst compositions can be activated by drying and calcination, for instance, under a temperature ranging from 800 to 1300° F. or more. After calcination the surface area of the catalyst can be decreased, for instance, by steaming at an elevated temperature, which often gives catalysts of less than about 150 square meters per gram, preferably about 50 to 100 square meters per gram, surface area.

The feeds of the present dehydrocyclization invention are aliphatic hydrocarbons of 6 to 10 or up to say 20 carbon atoms. The feeds are usually non-acetylenic and often are saturated or olefinically unsaturated hydrocarbons. The preferred feeds for dehydrocyclization are branched chain hydrocarbons containing a chain length of at least 5 carbon atoms and at least 2 branched lower alkyl chains. Particularly preferred are the saturated branched feeds containing a quaternary carbon atom and a chain length of at least 5 carbon atoms. Also suitable feeds for dehydrocyclization are naphthenes including gem naphthenes and aromatic hydrocarbons substituted with at least one aliphatic hydrocarbon, e.g., alkyl group of 6 or more carbon atoms.

The following examples are included to further illustrate the present invention but are not to be considered limiting.

Example I

A $Cr_2O_3$—Mg—$Na_2O$ on alumina catalyst was prepared in the following manner. 2100 g. of alumina trihydrate powder (Bayerite) was mixed dry with 7 g. of soluble starch and 7 g. of methyl cellulose in a Simpson Intensive Mixer. A solution of 368 g. of $Al(NO_3)_3 \cdot 9H_2O$ in 220 ml. of deionized water was added in small portions with short periods of mixing between additions. About 30 min. of mixing was given after the final addition. A dough was formed which extruded easily with a Welding Engineer's twin-worm extruder. 1/16 in. diameter extrudate was prepared. The extrudate was dried in a forced-air drying oven at about 230° F. The 1/16 in. extrudate was broken to less than 3/8 in. lengths and screened to free it from particles greater than 8 mesh and smaller than 14 mesh. The extrudate was calcinated in a muffle furnace heated to 600° F. at 30° F./hr., then to 1050° F. at about 100° F./hr., and then maintained at 1050° F. for 3 hours.

200 g. of 1/16 in. calcined alumina extrudate prepared as described above was vacuum impregnated with a solution of 11.6 g. of $NaHCO_3$ in deionized water to make 240 ml. The alumina was held in contact with the solution for about 5 hours, was then filtered out and dried overnight in a forced-air drying oven at about 230° F. The oven-dry material was calcined 6 hours at 900 °F., cooled, and vacuum impregnated with a solution made by dissolving 66 g. of $CrO_3$, 13.2 g. of MgO, and 2.0 g. of NaOH in deionized water to make 120 ml. The impregnated extrudate was dried in a forced-air drying oven at about 230° F., and was then calcined at 1400° F. for 5 hours in an atmosphere of about 20 percent steam in air and then for 1 hour at 1400° F. in dry air. Sample No. 900–947–5095. Analysis: 0.41 percent volatile at 1000° C., 18.4 percent $Cr_2O_3$, 3.48 percent MgO, 1.43 percent Na.

Example II

A portion of the catalyst described in Example I was charged to a 1 inch Universal type reactor and used for the dehydrocyclization of iso-octane (2,2,4-trimethylpentane) to isomeric forms of xylene. The catalyst was raised to operating temperature in a slow stream of nitrogen. Isooctane was then introduced to the reactor without any further pretreatment of the catalyst. After each run, the reactor was purged 15 minutes with $N_2$ and the coke burned off from the catalyst with an air-$N_2$ mixture. Temperatures during regeneration were maintained below a maximum of 1250° F. Data on dehydrocyclization using this catalyst is summarized in Table I.

TABLE I

| Feed | ASTM grade iso-octane, 99.98% | | |
|---|---|---|---|
| Catalyst No | 900–947–5095 | | |
| Run No | 1466–68A | 1466–68B | 1466–68C |
| Conditions: | | | |
| Ave. temperature, ° F | 1,014 | 1,004 | 1,009 |
| Outlet pressure, mm. of Hg | 76 | 76 | 76 |
| WHSV | 0.24 | 0.93 | 0.24 |
| Length of run, min | 30 | 15 | 30 |
| Diluent | None | None | None |
| Material balance, wt. percent | 98.1 | 100.1 | 87.9 |
| Conversion of iso-octane, wt. percent | 45.9 | 16.0 | 47.7 |
| Selectivity to p-xylene, mole percent | 41.3 | 39.5 | 40.5 |
| Selectivity to m-xylene, mole percent | 1.16 | .34 | 1.30 |
| Selectivity to o-xylene, mole percent | .25 | .07 | .31 |
| Total selectivity to xylenes, mole percent | 42.7 | 39.9 | 42.1 |
| p-Xylene/m-xylene ratio | 36/1 | 118/1 | 31/1 |
| p-Xylene/o-xylene ratio | 166/1 | >200/1 | 130/1 |
| Selectivity to isobutylene, wt. percent | 13.7 | 25.4 | 13.0 |
| Coke, wt. percent on feed | 5.8 | 1.4 | 6.2 |

The data of Table I show that the selectivity to p-xylene increased as the conversion of iso-octane increased. For example, in Run No. 1466–68B, at a 16.0 weight percent conversion of iso-octane, the selectivity to p-xylene was 39.5 mole percent. In Run No. 1466–68A, at a 45.9 weight percent conversion of iso-octane, the selectivity to p-xylene increased to 41.3 mole percent. The selectivity of Run No. 1466–68B was probably higher than normal because of the 15 min. cycle time. Table I also shows that the para to meta xylene ratio increased as the conversion of iso-octane decreased. For example, in Run No. 1466–68A, at a 45.9 weight percent conversion of iso-octane, the para to meta xylene ratio was approximately 36/1. In Run No. 1466–68B, at a 16.0 weight percent conversion of iso-octane, the para to meta xylene ratio increased to approximately 118/1. These data show that a higher purity of p-xylene can be obtained at lower iso-octane conversion levels.

Example III

A $Cr_2O_3$—MgO—$Na_2O$ on alumina catalyst was prepared in the following manner. Alcoa C–37 Bayerite was ball-milled in about 500 g. portions for about 24 hrs.

2000 g. of the ball-milled C-37 was mixed dry in the Simpson Intensive Mixer with 7 g. soluble starch and 7 g. methyl cellulose. 368 g. $Al(NO_3)_3 \cdot 9H_2O$ was dissolved in 150 ml. deionized water (heating was required) and added to the C-37 mixture in small portions. The resulting mixture was milled until a dough formed and was extruded ⅛ in. diameter using a Welding Engineer's twin-worm extruder. Three more 2000 g. batches were extruded in the same manner except that the $Al(NO_3)_3 \cdot 9H_2O$ was dissolved in only 100 ml. deionized water. Extrudate from all four batches was dried overnight at about 230° F. in a forced-air drying oven. The extrudate was broken into less than ¾ in. lengths and screened. The 4–8 mesh fraction was retained. The greater than 4 mesh fraction and less than 8 mesh fines were reprocessed by mulling into a dough with deionized water in the Simpson Intensive Mixer and was extruded, dried, and sized as above. Extrudate from all five batches was calcined in muffle furnaces heated to 600° F. at 30° F./hr., then to 1050° F. at about 100° F./hr., and finally maintained at 1050° F. for 3 hrs.

2000 g. of the calcined alumina extrudate was vacuum impregnated with 58 g. $NaHCO_3$ in deionized water to make 2800 ml. The alumina was held in contact with the solution for about 30 hrs. and then filtered out. A second 2000 g. batch of calcined alumina was impregnated in the same manner. The impregnated alumina was dried in a forced-air drying oven and then calcined in muffle furnaces heated to 900° F. at about 200° F./hr. and then maintained at 900° F. for 3 hrs.

An impregnation solution was prepared by dissolving 1320 g. $Cr_2O_3$, 264 g. MgO, and 40 g. NaOH in deionized water to make 2400 ml. 120 ml. portions of the impregnating solution were used to vacuum impregnate 205 g. portions of the $NaHCO_3$-impregnated alumina. 20 batches were impregnated in this manner. The catalyst was dried in a forced-air drying oven at 230° F. and then calcined at 1400° F. for 5 hrs. in an atmosphere of 20 percent steam in air and finally for 1 hr. at 1400° F. in dry air. Recovery 5042 g. Sample No. 900-02-X5175. Analysis: 1.06 percent volatiles at 1000° C., 17.5 percent $Cr_2O_3$, 1.22 percent Na, 3.10 percent MgO; surface area 97 m.²/g.

Example IV

A portion of the catalyst described in Example III was charged to a 1 inch Universal type reactor and used for the dehydrocyclization of iso-octane to isomeric forms of xylene. The procedure of Example II was followed. Data on dehydrocyclization using this catalyst are summarized in Table II.

TABLE II

| Feed | ASTM grade iso-octane, 99.98% | | |
|---|---|---|---|
| Catalyst No | 900-02-X5175 | | |
| Run No | 1604-15-03 | 1604-15-04 | 1604-15-05 |
| Conditions: | | | |
| Ave. temperature, °F | 1,023 | 1,020 | 1,018 |
| Outlet pressure, mm. of Hg | 135 | 135 | 77 |
| WHSV | 0.23 | 0.84 | 0.85 |
| Length of run, min | 30 | 30 | 30 |
| Diluent | None | None | None |
| Material balance, wt. percent | 97.3 | 95.6 | 100.2 |
| Conversion of iso-octane, wt. percent | 54.1 | 37.9 | 32.3 |
| Selectivity to p-xylene, mole percent | 48.1 | 34.2 | 41.5 |
| Selectivity to m-xylene, mole percent | 0.7 | 0.4 | 0.8 |
| Selectivity to o-xylene, mole percent | 0.2 | 0.3 | 0.4 |
| Total selectivity to xylenes, mole percent | 49.0 | 34.9 | 42.7 |
| p-Xylene/m-xylene ratio | 72 | 87 | 51 |
| p-Xylene/o-xylene ratio | 227 | 112 | 115 |
| Selectivity to isobutylene, wt. percent | 9.1 | 31.3 | 27.6 |
| Coke, wt. percent on feed | 9.88 | 5.42 | 4.45 |

The data of Table II show that the selectivity to p-xylene increased as the conversion of iso-octane increased. For example, in Run No. 1604-15-04, at a 37.9 weight percent conversion of iso-octane, the selectivity to p-xylene was 34.2 mole percent. In Run No. 1604-15-03, at a 54.1 weight percent conversion of iso-octane, the selectivity to p-xylene increased to 48.1 mole percent. Table II also shows that the para to meta-xylene ratio increased as the conversion of iso-octane decreased. For example, in Run No. 1604-15-03, at a 54.1 weight percent conversion of iso-octane, the para to meta-xylene ratio was approximately 72/1. In Run No. 1604-15-04, at a 37.9 weight percent conversion of iso-octane the para to meta-xylene ratio increased to approximately 87/1. These data show that a higher purity of p-xylene can be obtained at lower iso-octane conversion levels. Run No. 1604-15-05 at a lower pressure showed a lower para to meta-xylene radio and increased selectivity over Run Nos. 1604-15-03 and 04 at a higher pressure.

Example V

A sample of the $MgO$—$CR_2O_3$—$Al_2O_3$—$Na_2O$ catalyst was tested for thermal stability by subjecting it along with other catalysts to aging in a muffle furnace. The results of the thermal aging are contained in Table III below.

TABLE III

| Catalyst | Virgin | Surface area (m.²/gm.) after 26 hrs. at 1,600° F. |
|---|---|---|
| MgO-Cr₂O₃-Al₂O₃-Na₂O Catalyst of Example III | 97 | 57 |
| Commercial catalyst A | 95 | 51 |
| Commercial catalyst B | 61 | 17 |

The results of the tests contained in Table III show that the thermal stability of the catalyst of this invention was equal to or better than either the Commercial Catalysts A or B.

It is claimed:

1. A process for the dehydrocyclization of an aliphatic hydrocarbon of 7 to 20 carbon atoms containing a chain length of at least 5 carbon atoms and at least 2 branched lower alkyl chains which comprises contacting the hydrocarbon under vapor phase dehydrocyclization conditions including a temperature of about 900 to 1250° F. with a catalyst consisting essentially of about 1 to 40 percent by weight $Cr_2O_3$, about 1 to 40 percent by weight MgO, about 0.1 to 4 percent by weight alkali metal present as the alkali metal oxide, and activated alumina.

2. The process in claim 1 wherein the catalyst composition contains about 10 to 20 percent by weight $Cr_2O_3$, about 1 to 20 percent by weight MgO and about 0.8 to 2 percent by weight alkali metal as the alkali metal oxide and the surface area is below about 150 square meters per gram.

3. The process of claim 2 wherein the alkali metal oxide of the catalyst composition is sodium oxide.

4. The process of claim 3 wherein the temperature is about 1000 to 1150° F.

5. The process of claim 4 wherein the hydrocarbon is an aliphatic hydrocarbon of 6 to about 12 carbon atoms.

6. The process of claim 5 wherein the hydrocarbon is 2,2,4-trimethylpentane and the dehydrocyclization product is para-xylene.

7. A process for the dehydrocyclization of an aliphatic hydrocarbon of 7 to 20 carbon atoms containing a chain length of at least 5 carbon atoms and at least 2 branched lower alkyl chains which comprises contacting the hydrocarbon under vapor phase dehydrocyclization conditions at a temperature of about 900 to 1250° F. with a catalyst composition consisting essentially of about 10 to 20 percent by weight $Cr_2O_3$ and about 0.1 to 2 percent by weight alkali metal as the alkali metal oxide on a magnesium aluminate spinel support containing the equivalent of about 1 to 40 percent by weight magnesium oxide.

8. The process of claim 7 wherein the alkali metal of the catalyst composition is present in an amount of about 0.4 to 0.6 percent by weight as the alkali metal oxide.

9. The process of claim 8 wherein the alkali metal of the catalyst composition is sodium oxide.

10. The process of claim 7 wherein the temperature is about 1000 to 1150° F.

11. The process of claim 7 wherein the catalyst has a surface area of about 50 to 100 square meters per gram.

12. The process of claim 10 wherein the hydrocarbon is an aliphatic hydrocarbon of 6 to about 12 carbon atoms.

13. The process of claim 11 wherein the hydrocarbon is 2,2,4-trimethylpentane and the dehydrocyclization product is para-xylene.

References Cited

UNITED STATES PATENTS 3,363,023   1/1968   Mooi et al. _____ 260—680

DELBERT E. GANTZ, Primary Examiner

J. M. NELSON, Assistant Examiner

U.S. Cl. X.R.

260—683.3